Dec. 6, 1960
A. S. KASPERIK ET AL
2,963,519
ZEOLITIC MOLECULAR SIEVE ADSORPTION
PROCESS USING THE ADSORBATE AS
THE DESORBING MEDIUM
Filed Sept. 3, 1957
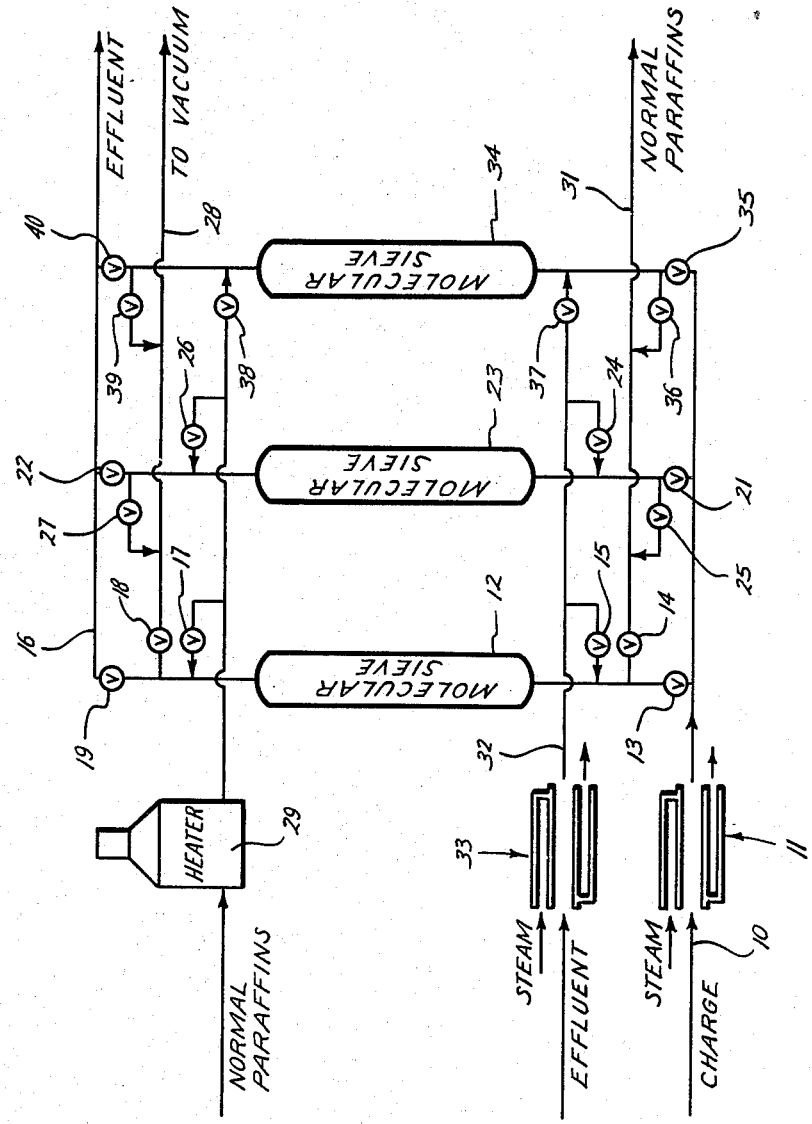
Archibald S. Kasperik
Sherman C. Justus, Jr.
INVENTORS
BY J. Vincent Martin
Joe E. Edwards
M. Harvey Gay
ATTORNEYS & # United States Patent Office 2,963,519
Patented Dec. 6, 1960

2,963,519

ZEOLITIC MOLECULAR SIEVE ADSORPTION PROCESS USING THE ADSORBATE AS THE DESORBING MEDIUM

Archibald S. Kasperik and Sherman C. Justus, Jr., Houston, Tex., assignors to Signal Oil and Gas Company, a corporation of Delaware Filed Sept. 3, 1957, Ser. No. 681,584

6 Claims. (Cl. 260—676)

This invention relates to the use of a molecular sieve for adsorptive separation and more particularly to regeneration of such a sieve.

Some light petroleum refinery streams contain varying amounts of normal paraffins. These normal paraffins are characterized by, among other things, low octanes. The octane number of such a stream will vary, therefore, depending upon the amount of these normal paraffins present. It is therefore desirable to be able to remove these normal paraffins to obtain high octane gasoline. The separated normal paraffins have chemical value.

Such removal may be partially obtained by fractionation. However, the degree of fractionation must be high because the boiling points of some of the normal paraffins and other components of the stream are very close together. For instance, the boiling points of normal hexane and methylcyclopentane are only about five degrees Fahrenheit apart.

Molecular sieves are known to be highly effective in adsorbing normal paraffins. These molecular sieves are synthetic zeolites having particular structural characteristics. The crystalline structure of the zeolites contains a large number of small cavities interconnected by a number of still smaller holes or pores. These cavities or pores are precisely uniform in size, so that only certain size molecules can enter into them. The molecular sieves are obtainable from Linde Air Products Company in a pore size of 5 Angstrom units in diameter. This diameter is larger than the diameter of normal paraffin molecules, as well as normal olefin molecules. The diameter is smaller than the diameter of iso-paraffins, iso-olefins, benzene, and all aromatics, as well as other compounds usually found in refinery streams. Thus, they are well suited to removing normal paraffins and normal olefins. However, it is believed this invention will find its greatest usefulness in removing normal paraffins from a stream from which the normal olefins have already been removed.

These molecular sieves are characterized by losing their adsorptive characteristics with elevated temperatures. Due to the beds employed in hydrocarbon adsorptive processes, it is difficult to apply direct heat to the beds to drive off the adsorbate.

By this invention we provide a novel method of regenerating the saturated molecular sieves using the adsorbate and effluent. The bed is heated by passing hot adsorbate therethrough. After the bed has been regenerated it is cooled by passing effluent therethrough.

This invention will be explained as it applies to removing normal paraffins from a refinery stream but it will be understood that it may be used with equal facility in removing other small diameter molecules from a stream such as normal olefins.

It is an object of this invention to provide a method of removing small diameter molecules from a stream by an adsorption process.

Another object is to provide a method of removing normal paraffins from a hydrocarbon stream by an adsorption process.

Another object is to provide a method of removing small diameter molecules such as normal paraffins from a stream with a molecular sieve and reactivating the sieve by passing hot adsorbate through the bed.

Another object is to provide a method of removing small diameter molecules from a stream with a molecular sieve and reactivating and cooling the sieve with adsorbate and effluent without contaminating either the adsorbate or effluent.

Another object is to provide a method of continuously removing small diameter molecules from a stream utilizing a plurality of molecular sieves and reactivating some of the sieves with heated adsorbate while others are on-stream and cooling each sieve with effluent before it is placed on-stream.

Another object is to provide a method as in the preceding object wherein the method is carried out without contamination of either the adsorbate or effluent used in reactivating and cooling the sieve.

Other objects, features and advantages will be apparent from the specification, drawing and claims.

The single figure of the drawing shows a simplified flow diagram of apparatus for practicing the method of this invention.

In practicing the method of this invention, a stream containing molecules to be removed is passed through a molecular sieve designed to adsorb molecules of the size desired to be removed from the stream. This process is continued until the sieve is saturated with adsorbate at which time the sieve is removed from the stream. Preferably effluent remaining in the sieve is removed either by evacuating the sieve or passing a gas such as natural gas therethrough.

Adsorbate previously removed is then heated and passed through the sieve to heat the sieve to a temperature at which it no longer functions as an adsorbent and gives up the adsorbed molecules.

After the sieve has been reactivated in this manner the free adsorbate is preferably removed either by evacuating the sieve or passing a gas therethrough.

The sieve is now reactivated but too hot to function as an adsorbent and it is necessary to cool the sieve. For this purpose effluent either previously collected or from other beds may be passed through the sieve to cool the sieve to the desired operating temperature and at this time the sieve may again be placed in the stream.

Preferably a battery of sieves are used to permit continuous operation.

Referring now to the drawing wherein there is shown a flow diagram of a system for removing normal paraffins, the charge of a hydrocarbon mixture containing normal paraffins which it is desired to remove is brought from a convenient storage point through line 10 and heated in the steam or other suitable heat exchange 11 to vaporize the charge. The charge is heated only enough to vaporize it as the adsorptive powers of the bed decrease with increasing temperature. As an illustration some streams may require an operating temperature of 300° F. All operations are preferably carried out in the vapor phase as control of operations is much easier. In vapor phase operations normal paraffins can be recovered practically quantitatively.

The vaporized charge is directed through the molecular sieve 12 by opening valve 13 and closing valves 14 and 15.

The molecular sieve 12 is provided by a vessel packed with synthetic zeolite selected to have a pore size of five angstrom units which is larger than normal paraffins but smaller than the iso-paraffins and other constituents of the charge stream which are not desired to be adsorbed.

While in the sieve the normal paraffins are adsorbed and effluent is discharged through a line 16; valves 17 and 18 being closed and valve 19 being open while the sieve 12 is on stream.

As soon as sieve 12 is saturated, valves 13 and 19 are closed and comparable valves 21 and 22 associated with the second molecular sieve 23 are opened to direct the charge through the sieve 23. At this time the valves 24, 25, 26, and 27 which are associated with sieve 23 will be closed.

After the saturated sieve 12 is isolated all effluent is preferably removed therefrom. In the illustrated system this is accomplished by opening valve 18 and pulling a vacuum in line 28 to evacuate sieve 12. Preferably the vacuum exerted on the sieve is on the order of 2 inches $H_g$ absolute. This will effectively remove the effluent from the sieve to prevent contamination of the regeneration fluid by effluent remaining in the sieve.

The sieve 12 is regenerated by heating it to a temperature at which it loses its adsorptive characteristics. In regeneration of sieve 12 the vacuum valve 18 is closed and adsorbate valves 17 and 14 are opened to permit passing of adsorbate through the sieve.

Adsorbate for regenerating sieve 12 may be obtained from storage of normal paraffins which are passed through heater 29. The vaporized adsorbate from heater 29 passes through valve 17 to the molecular sieve and heats the sieve to a temperature at which it loses its adsorptive characteristics. The adsorbate which passes through the sieve as well as that given up by the sieve pass out through valve 14 to a line 31 and thence to storage. Of course the heated adsorbate may be recycled to save fuel.

The hot adsorbate is passed through the sieve until a temperature of 650–700° F. is reached. At this temperature the sieve will release the adsorbed normal paraffins.

Before the sieve can be again placed on stream it must be cooled to a temperature at which the adsorptive characteristics for normal paraffins return. This is preferably accomplished by passing effluent through the sieve until it is cooled to approximately 300° F. However it is desired not to contaminate the effluent with any normal paraffins left in the sieve and it is preferred to first clean the sieve of normal paraffins which are present in the bed but are not adsorbed due to the elevated temperature. For this purpose the valve 18 is again opened and a vacuum pulled on the sieve to evacuate normal paraffins therefrom. The evacuated normal paraffins are conducted through line 29 to storage.

After the sieve 12 has been evacuated, vacuum valve 18 is again closed and valves 15 and 19 are opened. Effluent is introduced into the sieve from line 32 to cool the sieve to approximately 300° F. The effleuent may be the effluent from one of the other sieves or it may be effluent from storage. If effluent from storage is used it is preferably vaporized in heat exchanger 33. While a steam heat exchanger is illustrated for purposes of simplicity it will be understood that hot vapors leaving the sieve being regenerated may provide the source of heat.

Three or more sieves, 12, 23, and 34 are provided so that one sieve may be on stream, one sieve going through the regeneration process, and one sieve going through the cooling step simultaneously. Thus, for instance, sieve 12 may be on stream while sieve 23 is being regenerated and sieve 34 is being cooled. A group of valves 35 through 40 are provided for sieve 34 and correspond to the valves for each of the other sieves so that each sieve may be in a different stage of operation as explained above. Of course a larger number of sieves could be provided if desired. As the three stages of the operation require approximately the same length of time at least three beds have been found desirable to permit one bed to be on stream at all times for continuous operation.

From the above it will be seen that there has been provided a method of removing small diameter molecules from a stream and then regenerating and cooling the synthetic zeolite used in the adsorptive step using adsorbate and effluent.

While the method may be used with any desired stream it has been found to be very satisfactory in removing normal paraffins from light refinery streams consisting of predominately saturated hydrocarbons containing varying amounts of normal paraffins.

The method may also be utilized to remove both the normal paraffins and normal olefins from an unsaturated stream. However, it is thought that it will normally be preferred to first remove the normal olefins in one process and then remove the normal paraffins with the process of this invention.

As the process will remove substantially quantitatively the normal paraffins from a hydrocarbon stream the octane numbers of the stream will be substantially increased.

The foregoing disclosure and description of the invention is illustrative and explanatory thereof and various changes may be made within the scope of the appended claims without departing from the spirit of the invention.

What is claimed is:

1. The process of removing molecules below a predetermined size from a hydrocarbon stream comprising the steps of, passing a charge through a zeolitic molecular sieve having uniform passages therein of approximately 5 angstrom units in diameter and adsorbing from the charge molecules selected from the group of normal paraffins and normal olefins until the sieve is saturated, and then passing heated adsorbate through the sieve to heat it to a temperature at which it loses its adsorptive characteristics to recover the adsorbed molecules from the sieve.

2. The process of removing molecules below a predetermined size from a hydrocarbon stream comprising the steps of, passing a charge through a zeolitic molecular sieve having uniform passages therein of approximately 5 angstrom units in diameter and adsorbing from the charge molecules selected from the group of normal paraffins and normal olefins until the sieve is saturated, removing substantially all effluent from the sieve, and then passing heated adsorbate through the sieve to heat it to a temperature at which it loses its adsorptive characteristics to recover the adsorbed molecules from the sieve.

3. The process of removing molecules below a predetermined size from a hydrocarbon stream comprising the steps of, passing a charge through a zeolitic molecular sieve having uniform passages therein of approximately 5 angstrom units in diameter and adsorbing from the charge molecules selected from the group of normal paraffins and normal olefins until the sieve is saturated, removing substantially all effluent from the sieve, passing heated adsorbate through the sieve to heat it to a temperature at which it loses its adsorptive characteristics to recover the adsorbed molecules from the sieve, and then removing substantially all adsorbate from the sieve.

4. The process of removing molecules below a predetermined size from a hydrocarbon stream comprising the steps of, passing a charge through a zeolitic molecular sieve having uniform passages therein of approximately 5 angstrom units in diameter and adsorbing from the charge molecules selected from the group of normal paraffins and normal olefins until the sieve is saturated, removing substantially all effluent from the sieve, passing heated adsorbate through the sieve to heat it to a temperature at which it loses its adsorptive characteristics to recover the adsorbed molecules from the sieve, and then passing effluent through the sieve to cool it before it is placed on stream again.

5. The process of removing molecules below a predetermined size from a hydrocarbon stream comprising the steps of, passing a charge through a zeolitic molecular sieve having uniform passages therein of approximately 5 angstrom units in diameter and adsorbing from the charge molecules selected from the group of normal paraffins and normal olefins until the sieve is saturated, passing heated adsorbate through the sieve to heat it to a temperature at which it loses its adsorptive characteristics to recover the adsorbed molecules from the sieve, and then passing effluent through the sieve to cool it before it is placed on stream again.

6. The process of removing molecules below a predetermined size from a hydrocarbon stream comprising the steps of, passing a charge through a zeolitic molecular sieve having uniform passages therein of approximately 5 angstrom units in diameter and adsorbing from the charge molecules selected from the group of normal paraffins and normal olefins until the sieve is saturated, removing substantially all effluent from the sieve, passing heated adsorbate through the sieve to heat it to a temperature at which it loses its adsorptive characteristics to recover the adsorbed molecules from the sieve, removing substantially all adsorbate from the sieve, and then passing effluent through the sieve to cool it.

References Cited in the file of this patent

UNITED STATES PATENTS

| | | |
|---|---|---|
| 2,527,964 | Robinson | Oct. 31, 1950 |
| 2,818,449 | Christensen et al. | Dec. 31, 1957 |
| 2,818,455 | Ballard et al. | Dec. 31, 1957 |
| 2,859,256 | Hess et al. | Nov. 4, 1958 |
| 2,899,379 | Wilchinsky et al. | Aug. 11, 1959 |
| 2,901,519 | Patterson et al. | Aug. 25, 1959 |